United States Patent
Rausch et al.

(10) Patent No.: US 8,696,907 B2
(45) Date of Patent: Apr. 15, 2014

(54) PLANT FOR THE TREATMENT AND DISPOSAL OF WASTE WATER CONTAINING SALTS AND OIL AND METHOD FOR THE TREATMENT AND DISPOSAL OF WASTE WATER CONTAINING SALTS AND OIL

(75) Inventors: Wolf-Dieter Rausch, Salzburg (AT); Roman Breuer, Pfaffenhofen an der Ilm (DE)

(73) Assignee: Bauer Umwelt GmbH, Schrobenhausen (DE)

(*) Notice: Subject to any disclaimer, the term of this patent is extended or adjusted under 35 U.S.C. 154(b) by 304 days.

(21) Appl. No.: 13/142,301

(22) PCT Filed: Nov. 9, 2009

(86) PCT No.: PCT/EP2009/007996
§ 371 (c)(1),
(2), (4) Date: Jun. 27, 2011

(87) PCT Pub. No.: WO2010/085993
PCT Pub. Date: Aug. 5, 2010

(65) Prior Publication Data
US 2011/0272349 A1 Nov. 10, 2011

(30) Foreign Application Priority Data
Jan. 30, 2009 (EP) .................................. 09001327

(51) Int. Cl.
*C02F 3/32* (2006.01)
*B01D 1/00* (2006.01)
(52) U.S. Cl.
USPC ............ 210/602; 210/614; 210/620; 210/259
(58) Field of Classification Search
USPC ......... 210/602, 614, 620, 776, 252, 253, 259, 210/260, 923
See application file for complete search history.

(56) References Cited

U.S. PATENT DOCUMENTS

| 3,770,623 A | 11/1973 | Seidel |
| 4,267,038 A * | 5/1981 | Thompson .................... 210/602 |

(Continued)

FOREIGN PATENT DOCUMENTS

| DE | 29919732 U1 | 2/2000 |
| DE | 19838692 A1 | 3/2000 |

(Continued)

OTHER PUBLICATIONS

PCT, International Preliminary Report on Patentability, International Application No. PCT/EP2009/007996, International Filing Date Nov. 9, 2009, 6 pages.

(Continued)

*Primary Examiner* — Fred Prince
(74) *Attorney, Agent, or Firm* — Hoffman Warnick LLC

(57) ABSTRACT

The invention relates to a plant and a method for the treatment and disposal of waste water containing salts and oil, in particular produced water, comprising at least one settling area for receiving the waste water and for separating oil proportions from the waste water, at least one subsequent reed bed area having plants for the uptake and degradation of contaminants in the waste water, at least one modular basin area having a plurality of utility basins, whereby a utility basin, controlled by way of distribution means, can be supplied with treated waste water from the reed bed area and/or from at least one other utility basin, and at least one saline area for the reception of the residual water from the modular basin area and for the evaporation of water and the concentration of salt.

16 Claims, 3 Drawing Sheets

(56) References Cited

U.S. PATENT DOCUMENTS

| | | |
|---|---|---|
| 5,174,897 A | 12/1992 | Wengrzynek |
| 5,389,257 A | 2/1995 | Todd et al. |
| 6,159,371 A * | 12/2000 | Dufay .......... 210/602 |
| 6,773,594 B1 * | 8/2004 | van der Wijngaart ......... 210/605 |
| 6,878,280 B2 * | 4/2005 | McDowell et al. ........... 210/614 |

FOREIGN PATENT DOCUMENTS

| | | |
|---|---|---|
| FR | 2834284 A1 | 7/2003 |
| WO | 2005108310 A1 | 11/2005 |
| WO | 2009000845 A2 | 12/2008 |

OTHER PUBLICATIONS

Sluijterman et al, Opportunities for re-use of produced water around desert oil fields, Proceedings of the International Petroleum Conference and Exhibition, SPE No. 88667, Oct. 10, 2004, pp. 1-7, XP002477367.

* cited by examiner

PLANT FOR THE TREATMENT AND DISPOSAL OF WASTE WATER CONTAINING SALTS AND OIL AND METHOD FOR THE TREATMENT AND DISPOSAL OF WASTE WATER CONTAINING SALTS AND OIL

BACKGROUND

The invention relates to a plant for the treatment and disposal of waste water containing salts and oil and to a method for the treatment and disposal of waste water containing salts and oil.

BRIEF SUMMARY

Plant-based water clarification plants bring about a nature-orientated biological purification of waste water by making use of ground filters overgrown with helophytes. In particular for economical and ecological reasons they are suitable for decentralized waste water treatment that distinguishes itself by small specific lengths of channels/pipe lines. Apart from the requirement of suitable surface dimensions and locations they offer the significant advantage of their nature-friendly integration into the surrounding environment.

These plants operating on a biological basis are, at present, still subject to intensive further development, whereby the most important development objectives, in addition to the enlargement of their fields of application and the improvement of functional properties, lie in the lowering of investment costs.

For decentralized waste water treatment plant-based water clarification plants have recently been used to a growing extent, in which the waste water flows through a ground body planted with specific marsh plants, whereby chemical-physical and biological purification processes take place. Waste water treatment takes place through interaction of the specifically selected ground layers, the marsh plants, micro-organisms and the interstitial air present in the ground layers. The ground body is composed of several ground layers that differ from one another with regard to material and grain size.

From the German utility model DE 299 19 732 U1 a plant-based water clarification plant of modular construction is known. The module shown therein distinguishes itself by the fact that it contains a flowed-through overgrown ground filter in a dimensionally stable container. This container has a ready-to-connect integrated duct or drainage system on the container bottom and a distribution system at the surface of the ground filter. In this way it is to be ensured that a uniform flow-through is attained throughout the entire ground filter. For the set-up of a plant-based water clarification plant several of such modules are interconnected. Completion of the plant-based water clarification plant takes place upon installation in the respective ground section. In addition, equipment units, such as feed and discharge pumps as well as the associated control elements are installed and connected to the modules in readiness for operation.

DE 198 38 692 A shows a plant-bed water clarification plant for stationary use. This plant-bed water clarification plant has in the inlet section a multi-chamber pit that supplies waste water via a distribution shaft to the actual plant clarification stage. The plant clarification stage is followed on the terminal side by a separate control shaft. Thus, this plant-bed water clarification plant consists of at least four volume bodies which have to be introduced separately into the ground and connected to one another in the correct way during installation. However, this plant is only suitable for the treatment of waste water having a low degree of pollution, especially from private households, and for relatively small volumes of waste water. Moreover, apart from the waste water treatment no further commercial added value is generated by the plant.

Specific demands on waste water treatment are made by oil extracting plants which generate considerable quantities of water contaminated with oil residues and containing high proportions of salt, so called "produced water" which is also referred to as process water and stems from crude oil exploitation. The safe and environmentally friendly disposal of this produced water poses a fundamental problem, especially in countries located in arid climatic zones, where the contamination of scarce drinking water resources is to be prevented by all means.

In the Sultanate of Oman for example around 600,000 $m^3$/day of produced water containing an oil proportion of 6-8% are generated at present and according to forecasts this volume will rise to 900,000 $m^3$/day by the year 2013. This water is contaminated with petroleum oils, phenols, emulsifiers and a large diversity of metal ions in variable concentrations. Moreover, the water has a relatively high electric conductivity. The currently practiced methods for the disposal in deeper lying water-bearing strata and the injection into the ground material located underneath no longer satisfy the continuously growing demands of environmental regulations. In addition, these measures require high costs to provide the necessary energy for which reason they are very inefficient from an economical viewpoint. What is more, in this way an enormous amount of potentially reusable water, a precious entity particularly in desert regions, for the irrigation of agriculturally deployed regions or for the supply of drinking water for the population is lost.

WO 2209/00845 A discloses a plant and a respective method according to the preamble for the treatment of produced water from an oil well plant. The produced water is separated in an oil-water separator in a crude oil fraction and in a fraction of produced water. Subsequently, at least a fraction of produced water is fed into an irrigation system with a cascade of soil beds for biological purification and reduction of the crude oil and metals content.

Starting from this prior art the invention is based on the object to provide a plant for the treatment and disposal of waste water containing salts and oil, in particular produced water, as well as a cost-efficient method for the treatment and disposal of waste water containing salts and oil.

The invention solves this object by a plant for the treatment and disposal of waste water containing salts and oil and by a method for the treatment and disposal of waste water containing salts and oil. Advantageous embodiments of the invention are stated in the dependent claims.

In the plant according to the invention provision is made for at least one settling area for receiving the waste water and for separating oil proportions from the waste water, at least one subsequent reed bed area as a so-called "reed bed", cane or plant bed respectively having plants for the uptake and degradation of contaminants in the waste water, a modular basin area having a plurality of utility basins, whereby a utility basin, controlled by way of distribution means, can be supplied with treated waste water from the reed bed area and/or from at least one other utility basin, and at least one saline area for the reception of the residual water from the modular basin area and for the evaporation of water and the concentration of salt.

Thus, in the individual areas the different proportions of contaminants contained in the waste water, in particular the proportions of residual oil and the dissolved proportions of salt, can be recovered separately and reused economically in a defined way in order to compensate for a considerable part of the costs incurred for the operation and maintenance of the plant. Moreover, through appropriate utilization of the nutrients contained in the waste water it is possible to generate in the modular basin area an additional value that even allows for an economically profitable operation of the plant.

During operation of the plant the planting in the reed bed area produces a large amount of biomass that can serve e.g. for the production of bio-fuel or cellulose. Furthermore, parts of the reed bed can also be planted with ornamental, energy or forage plants that can be harvested at regular intervals and then sold or utilized in some other way. Especially in desert regions, reed bed areas of an appropriate large size that are overgrown with green plants can also add a significant contribution to the green-zone enrichment of the respective areas and in this way enhance the attractiveness of these regions for both the population and tourists.

A characteristic of the employed plant species is that they have a high tolerance with regard to the salt content present in the waste water. Thus, as ornamental plants mangrove species, such as *Avicennia marina*, as well as the fig (*Ficus vasta*) and the Ghaf tree (*Prosopis cineraria*) are especially suitable for this purpose. As forage plants e.g. Christ thorn (*Ziziphus spina-christi*) that produces edible fruit as well as leaf substances for use in cosmetics and Monk's pepper (*Vitex agnus-castus*), whose substances are used in medical applications, are suitable.

In the saline area, through the evaporation of water and the concentration beyond the concentration of saturation, valuable salts as for example sulphates, nitrates, halogenides etc. can be precipitated and recovered in order to use them for further processing, as for instance for the production of fertilizers.

With the plant according to the invention a considerable proportion of the toxic organic and inorganic contaminants is removed and at the same time a number of valuable by-products are obtained. More particularly, the metal concentration of aluminum, barium, chrome, copper and zinc is lowered by up to 80% and that of iron, lithium, manganese, lead, arsenic, cadmium, cobalt, molybdenum, nickel, selenium, kalium and vanadium is lowered by up to 40%. For the total hydrocarbon concentration a reduction of up to 96% is achieved.

The mechanisms of degradation are based on complex interactions between substrate, macrophytes and the associated micro-organisms. Aerobic processes dominate in the system over anaerobic processes in the degradation of both the inorganic and organic contaminants. Especially the interaction between the ground matrix, the plants and the microbial population is responsible for a great number of processes of degradation of contaminants. These include in particular phytoextraction, phytostabilization, rhizofiltration and phytovolatilization. As a result of the economic profit of the by-products obtained a plant is achieved, which, in comparison to other plant-based water treatment systems, can be operated at extremely low cost and can even yield profitable results.

It is according to the invention if the reed bed area has several parallel arranged reed bed segments, which are each formed of several reed bed basins that are arranged and flowed through in series.

In this manner the quantity of waste water that is to be received and overflow and the resultant clarification capacity can be raised distinctly and, in addition, the yield of valuable by-products can be increased, too. Moreover, the serially arranged reed bed basins allow in each case for the defined provision of a specific plant cultivation that is optimally adapted to the oil and salt concentration present in the waste water in the respective case. The transport of waste water between the individual reed bed basins can take place either through simple seepage processes in a lateral fashion between the individual basins or through distribution and connecting ducts arranged between the basins. These connecting ducts can in turn be equipped with valve means in order to control the through-flow of the waste water.

As a result of the settling area, which is provided before the reed bed area and serves for receiving the waste water and for separating oil proportions from the waste water, large parts of the oil proportions that adsorb on the water surface can be separated as early as before entry into the reed bed, whereby excessive strain of the reed bed area is prevented. The individual utility basins of the modular basin area can be set up both subsequent to the reed bed area and parallel thereto. In the case of a parallel arrangement of the utility basins the intended practical applications can be selectively orientated to the respective salt content of the waste water. In this way use can be made of various practical applications with different requirement profiles in each case.

In addition to the degradation and uptake of the organic and inorganic contaminants in the waste water a considerable loss of water caused by evaporation also takes place in the reed bed area that can amount to up to two thirds of the total quantity of water. Evaporation in the reed bed area takes place via the leaf mass of the plant cover and the water surface. Furthermore, parallel to the microbiological degradation of the organic contaminants and the uptake of the heavy metal cations in the ground area the ultraviolet radiation of the sun causes a cleavage of the polymolecular hydrocarbons adsorbed on the water surface. Through the cleavage these hydrocarbons are transformed to low-molecular compounds that can be taken up more easily by the ground matrix present in the reed bed area and can be degraded by the micro-organisms.

Since the solar radiation is generally less frequent in wintertime than in summertime, in this period additional basin areas, so-called "winter basins", can be connected in order to compensate for the lower rate of evaporation in this season by an increased number of basins. Hence, it is possible to purify a substantially constant quantity of waste water throughout the entire year.

The waste water that is already concentrated to a considerable extent due to the evaporation taking place in the reed bed area is thickened in the saline area through further evaporation so as to precipitate and recover the salts dissolved therein.

According to the invention, the settling area has several settling basins according to the number of reed bed segments. Furthermore, on the settling basin a distribution channel is provided for the supply and distribution of the waste water to the settling basins.

In this manner the waste water is distributed in a defined way to the individual reed bed segments arranged parallel to one another. In the case of any disturbances occurring in a segment the other parallel arranged segments can therefore continue to be operated unaffected and thereby ensure continuous operation of the plant.

In the area of the distribution channel a screening or crushing means can furthermore be provided in order to prevent larger solid matter from entering the settling area or crush it to the desired particle size. Moreover, through an appropriate choice of the channel width or through additionally provided pump and valve means the flow rate of the waste water and therefore the inflow rate into the settling area can be set in a defined manner in the distribution channel. At the bottom of the distribution channel a collecting means can furthermore be provided that receives deposited sediment material.

In addition, it is of advantage if trafficable dams are provided between the individual basins.

On such paved dams utility vehicles can be deployed that serve for example for harvesting plant material from the reed bed area or for supplying nutrients or introducing further plant and microbiological material. In particular, by applying suitable surfacing material, e.g. asphalt, the passable or trafficable surface of the dams can be adapted for driving heavy utility vehicles on. By means of the utility vehicles and appropriate suction devices installed on them larger proportions of residual oil absorbed on the water surface can be sucked off. Other macroscopic matter, as for example plant parts, leaves, stalk material etc. can also be removed in this way. As a result, any possible blockage occurring in adjacent line systems or valve means can be prevented. In addition, via the access paths it is also possible to deliver measuring means for controlling the waste water quality. By preference, the dams are constructed of a coarse-grained material, e.g. gravel, to enable seepage of the waste water from one basin area into the next one. Alternatively or additionally, further drain lines can be provided for the transport of water through the dams. The dams can be stabilized by further means of fortification, as for example posts, in order to prevent slippage of the dam material into adjacent basins.

According to the invention the utility basins of the modular basin area are designed for the cultivation of plants, algae, for the culture of fish, shrimps and/or micro-organisms.

Through the cultivation of suitable biological or animal cultures high-quality organic products can be obtained which can make up to a considerable degree for the cost burden arising from the operation of the plant and even outstrip costs. The respective utility basins can also be rented to third persons.

Advantageously, the utility basins of the modular basin area are arranged between the reed bed area and the saline area, but alternatively they can also be provided parallel to these two areas. An arrangement following on from the reed bed area offers the advantage that a significant proportion of organic contaminants and heavy metal cations has already been removed so that even more sensitive plant and animal species can be grown or bred in these utility basins. Especially when growing or breeding cultures that are intended for human consumption an appropriate low degree of heavy metal pollution is required at any rate.

For the cultivation of plant species and the culture of animal species a number of possibilities are on hand. Specific algae species such as *Scenedesmus, Spirulina* and the like can be used for the production of pigments, such as carotenoids or chlorophyll, and vitamins and for the generation of polyunsaturated fatty acids, in particular ω3- and ω6-fatty acids, as well as proteins for the animal food industry. In addition to salt-water fish species the culture of shrimps, in particular, as high-quality food can be carried out in an advantageous manner in these utility basins. In utility basins lying further downstream that have a higher salt content extremely halophilic micro-organisms such as bacteria, e.g. *Halomonas*, or archaea, such as *Haloarula*, can be cultured. These bacteria or alternatively archaea species are suitable for the production of basic materials and fine chemicals for bioplastic substances, etherlipids or pigments for the cosmetic and food industry.

Since the content of salt continuously increases in the downstream direction due to the evaporation of water, in the individual utility basins plant and animal species can be used that are specifically adapted to the respective content of salt so that use can be made of a great variety of plant and animal organisms.

More particularly, it is also conceivable to use fungi that can serve for instance for the production of substances used for medical purposes, such as antibiotics. With regard to the changing weather conditions determined by the seasons the utility basins offer a high flexibility where their use is concerned. In order to allow for protection of highly sensitive species the individual utility basins can be protected against external influences by appropriate covering means. In the case of covering means manufactured of glass or acrylic glass a greenhouse effect can be simulated that leads to a significant increase in the productivity of plant cultivations in particular. To further enhance productivity carbon dioxide can be additionally supplied. Hence, through regular harvesting of the developed products it is possible to ensure a continuous recovery of valuable products.

It is advantageous for the basins of the settling area, the reed bed area, the modular basin area and the saline area to be arranged in a terraced manner and on decreasing levels in the flow direction of the waste water.

In this manner a simple downward flow of the waste water without any additional expense of energy is brought about, resulting in a highly energy-efficient operation of the plant. Through the terraced construction a very large surface of the individual areas is created, whereby a high rate of evaporation can be achieved on the one hand and on the other hand a high throughput can even be achieved in the case of relatively low, easily controllable waste water levels. For best suitability a single, terraced basin has a lateral dimension of a few hundred meters, in particular approximately 300 m, so as to ensure a simple and reliable management. A serially connected arrangement of four such terraced basins, a segment of a reed bed area, is able to adequately treat in a fully developed condition a waste water quantity of 1,500 $m^3$/day. In the case of a parallel arrangement of several of such segments it is thus possible to process 3,000 to 170,000 $m^3$ of waste water per day by means of the plant.

For the specific arrangement of large-surface terraces on continuously decreasing levels desert regions are particularly suitable where adequate geographic conditions are encountered frequently. In arid climatic zones the employed plant cultivations flourish particularly well due to intensive solar radiation and, in addition, the relatively high temperatures foster biochemical degradation of the organic contaminants by settled micro-organisms.

To allow for a sufficient gravitational effect for the transport of the waste water an advantageous overall gradient of 1 to 3%, in particular 1.8% is suitable. However, the slope rate does not have to be constant over the entire course of flow but can be adapted to the geographic conditions and the relevant requirements in the individual areas respectively. For instance it can be of advantage to provide a greater slope rate in the reed bed area, as a greater flow resistance occurs there than in the subsequent areas. On the other hand, however, adjustment to the conditions on site is not necessary but, if required, there is the possibility of reducing or intensifying the naturally given gradient through appropriate earth deposits or excavations. In this way it is possible to selectively set across the entire course of the plant the slope rate and the flow rate as a function of the flow resistance and therefore the dwelling time of the waste water in the different areas. To increase the flow rate of the waste water in the case of very low gradients provision can furthermore be made for additional channels or lines to be arranged between the dams.

According to the invention, in the settling area surface skimmers are provided, with which oil can be sucked off from the surface and directed to collecting tanks.

The produced water supplied from the distribution channel into the settling areas has a variable proportion of residual oil ranging from a few ppm up as far as into the percentage range. Accordingly, a considerable proportion of the residual oil will settle on the surface as an oil film. With the surface skimmers this surface film can be eliminated from the waste water surface in a relatively short time, whereby considerable proportions of residual oil are prevented from entering the reed bed area and subjecting it to excessive strain.

The oil sucked off from the surface is directed to collecting tanks, collected in them and can be removed at regular intervals for subsequent disposal or further processing. To increase the difference of the surface tension values between the residual oil and the water and thereby enlarge the proportion of oil adsorbed on the surface it is also possible to add to the waste water additional surface-active substances which should, for their part, be easily bio-degradable. As a matter of course, in addition to the oil film the surface skimmers can also take up other contaminants, as for example leaves, stalks and the like that could otherwise lead to blocking effects in the subsequent line system. The surface-active tensides that can be added whenever necessary can be applied separately or also parallel to the suction process with the surface skimmers. In order to recover as large a proportion of the residual oil as possible on the surface it is preferred if the waste water is retained in the settling areas for a longer period of time before being conveyed onwards into the reed bed area.

In another preferred embodiment of the plant according to the invention sensors for measuring the waste water level are arranged in the individual areas.

For correct treatment and maintenance of the plant growth in the reed bed area in particular it is necessary to keep a water level of approximately 0 to 20 cm. If the water level is too high the risk arises that the processed water volume is too high for the ground and plant material to be given sufficient opportunity for the uptake and degradation of contaminants. Moreover, the influence of the UV-proportion contained in the solar radiation which is useful for the cleavage of polymolecular organic compounds is most intensive in the areas close to the surface. For a correct operation of the plant it is furthermore necessary that the reed bed does not remain dry over a longer period of time, as this might impair the existence of the planting. In the case of an insufficient amount of humidity in the reed bed area the sensor can ensure the supply of water so that the reed bed does not dry out.

In addition to the sensors for the water level provision can also be made for other sensors for the concentration of contaminants and/or other physical or chemical parameters of the waste water. More particularly, further sensors for the content of oxygen, the water turbidity, the pH-value and for the temperature prove to be useful for controlling and maintaining a correct process of the biological purification mechanisms.

In another preferred embodiment of the plant according to the invention the ground of the reed bed area has a lower sealing layer for sealing and an upper substrate layer for planting, the reed bed area being planted with reed plants, in particular *Phragmites australis*.

By preference, the thickness of the sealing layer and the substrate layer respectively amounts to 10 to 30 cm, in particular 20 cm. As sealing layer materials mineral materials, such as compacted fine sand or loam and clay minerals, are suitable. Linings made of bentonite or HDPE are also suitable for use. The sealing layer prevents a premature seepage of the waste water into the subjacent ground water and thereby its contamination and prolongs the dwelling time in the reed bed area. Moreover, mineral materials such as bentonite or sand that are rich in various oxides and carbonates as well as siliceous soil minerals such as palygorskite and illite make a substantial contribution to the uptake of the metal cations dissolved in the waste water.

The substrate layer is preferably composed of the excavated, prepared ground material and additions from a nutrient-rich biological material such as hay, humus, turf or mud. These biological materials serve to boost microbial activity and thereby assist in the microbial degradation of the organic contaminants. Moreover, the substrate layer has a high content of nutrients that ensures proper growth of the planting provided for the layer.

In this matrix a distinctive rhizosphere can develop, too. With regard to soil ecology the rhizosphere is of particular importance because here an interaction of soil and plants takes place. The rhizosphere is strongly influenced by substances that are released by the plant, the so-called exudates. It differs from the surrounding soil by a lower concentration of nutrients and oxygen, as both substances are used up by the plant. Likewise, the pH-value can differ here by several units from the surrounding soil. Especially due to the released exudates and the improved pH-value conditions the rhizosphere distinguishes itself in most cases by a substantially higher settlement density of organisms ranging from the 5-fold to the 50-fold amount. The rhizosphere is an important habitat for a great variety of biocenoses that predominantly consist of nematodes, fungi, among other things mykorrhiza, and other micro-organisms. The higher settlement of organisms leads to the fact that additional nutrients are made available to the plant, for example through rhizobia or other bacteria that foster plant growth.

The planting which is provided on the substrate layer and consists of reed plants, in particular *Phragmites australis*, proves to be very effective where the transfer of oxygen into significant depths of soil is concerned. Moreover, with regard to the production of biomass the plant features a high productivity of up to 100 t/ha/year. The species *Phragmites australis* grows very fast and is capable of taking up both inorganic and organic contaminants whilst at the same time tolerating both a high salt content of the waste water and extreme environmental conditions. In addition, it produces a very dense growth that lends considerable support to the stability of the underlying substrate layer and contributes to the formation and development of a sediment layer. This reed plant also plays an important role in the supply of oxygen to the rhizosphere, a process which amplifies the precipitation of metal ions and facilitates the aerobic biological degradation process. After an existent period of only a few months the reed cultivation has developed sufficiently to bring about waste water purification.

Generally, reed is excellently suitable for the cultivation of the plant according to the invention. On account of its large leaf surface and the release of oxygen through hollow, air-bearing stalk parts, so-called aerenchymes, reed has an underwater water-purifying effect yielding a feed-in of oxygen of 5 to 12 grams of oxygen/$m^2$ per day. The feed-in of oxygen fosters the microbial degradation of organic substance through aerophilic bacteria that colonize in large numbers on the root hairs of the reed. For the filtering effect of the substrate layer the planting with reed proves to be of advantage, too. Due to its permanent growth of rhizomes the reed cultivation can loosen the substrate and in this way lower the risk of colmation. An intensive root penetration increases the purification capacity of the ground filter, since the feed-in of oxygen and root exudates effect a stimulation of the microbial degradation of contaminants in the rhizosphere and at the same time nutrients and contaminants are extracted from the ground solution.

An established reed surface transpires 800 to 1,000 liters of water/m$^2$ per vegetation period whereby the formation of seepage water in the ground filter is reduced accordingly. This promotes sorption and, due to the longer contact time, is also beneficial for root uptake and biological degradation. In addition, through shade and isolation the closed vegetation cover improves the ground-level microclimate. Even in wintertime bacteria still find temperatures of around +5° C. underneath decayed reed. Reed stalks as well as a continuous bedding supply of wide-meshed vegetation residues form on the ground an overground space filter, whose sedimentation surfaces complement the actual substrate filtration and, in addition, protect the ground filter against external colmation.

The major part of the degradation of the inorganic constituents can be ascribed to the ground material and the macrophytes that mainly take up the metals aluminum, barium, chrome, copper, zinc, iron, lithium, manganese, lead, arsenic, cadmium, cobalt, molybdenum, nickel, selenium, thallium and vanadium. Depending on the metal the ground substrate is able to take up a concentration range of 1 to 1,000 mg of metal per kg of ground material within the first year of operation. This reduction of the metal ion concentration can be tracked through measurement of the conductivity of the waste water. The metals are immobilized through aerobic as well as anaerobic processes. Especially when use is made of calciferous materials, carbonate materials such as calcite, constitute the dominant components of the ground material and have a significant effect on the mobility of metals. This is achieved through a continuous dissolution of the calcium carbonates which increase the alkaline level of the waste water and produce adequate conditions for the removal of metals or for their precipitation. A significant uptake of metals by the macrophytes takes place in a non-selective manner, especially in the case of low concentrations and high pH-values. For instance one kilogram of macrophytes is able to take up up to 4 g of metal. Likewise, the reed species *Phragmites australis* also possesses the ability to take up and concentrate various metallic salts, in particular the salts of the metals sodium, boron and strontium. These elements belong at the same time to those that are least absorbed by the ground matrix, for which reason they tend to be concentrated in the waste water as a result of the evaporation of water and in doing so to quickly exceed the admissible limit values. Their uptake is therefore all the more of advantage, as they would otherwise have a detrimental effect on the useful plants cultivated in the subsequent modular basin area, which do not have such a great tolerance to high metal concentrations and salts.

Likewise, the organic contaminants are mainly taken up and degraded in the reed bed area. The residual oil still present in the water is eliminated by means of three uptake mechanisms. The ground matrix itself retains approximately 15 mg/kg of ground material. The sediment layer and overlying parts of the planting take up oil in the range of approximately 40% in relation to the plant weight. In addition, the macrophytes also absorb hydrocarbons in a quantity of around 10 mg/kg. Hence, the growing reed material and a well-developed sediment layer function as efficient filters that bind a major part of the hydrocarbons. The hydrocarbons are thus prevented from entering into the mineral ground matrix, whereby their rapid distribution and transformation through various biotic and abiotic processes is facilitated. This means that the hydrocarbons retained by the sediment layer and the reed material are subjected to an active aerobic biological degradation as well as additional decay processes, such as photooxidation.

The reed material takes up the hydrocarbon compounds through different metabolic pathways inside the plants, transforms them and mineralizes them through phytodegradation, which is similar to that of other phytoremediative plants, into less toxic substances. The reed plants also make a significant contribution to the evaporation of the hydrocarbons, in particular the low-molecular compounds, on account of their high rate of evaporation, the so-called "phytovolatilization". This process is very pronounced under warm climatic conditions, in particular in desert regions. Furthermore, the bacteria settled on the root parts also contribute to a substantial degree to the metabolization of organic contaminants, as the roots constitute an ideal environment for the associated bacteria that supply them with various substrates, water, oxygen and other nutrients. The high inflow of organic material and simple substrates, the presence of nitrogenous, phosphorous and potassium salts as well as simple hydrocarbons at warm temperatures are ideal conditions for the bacterial populations.

The subject matter of the invention also resides in a method for the treatment and disposal of waste water containing salts and oil, in particular with the plant according to the invention, whereby the waste water successively flows through a settling area for receiving the waste water and for separating oil proportions from the waste water, at least one subsequent reed bed area having plants for the uptake and degradation of contaminants in the waste water, at least one modular basin area having a plurality of utility basins, whereby a utility basin, controlled by way of distribution means, can be supplied with treated waste water from the reed bed area and/or from at least one other utility basin, and at least one saline area for the reception of the residual water from the modular basin area and for the evaporation of water and the concentration of salt.

With the method according to the invention a large amount of waste water can be purified in an ecological manner and redirected into the water cycle for reuse and at the same time high-value plant, animal and mineral products can be recovered. By taking advantage of a gradient and the related gravitational effect for the flow transport of the waste water the method can be implemented at a very low expense of energy. What is more, in the case of operation in desert regions the energy required for the evaporation of water can be dispensed with. In connection with the products obtained in the utility basins and the profit yielded by them this results in a highly positive energetic and economic overall balance of the method.

A high flexibility with regard to the economical utilization is offered in particular by the individual utility basins of the modular basin area, which, in being each utilized in different, variable ways, are supplied with parts of the waste water flow. Consequently, specifically adapted product ranges can be made available depending on the market conditions.

On account of the combination of biological degradation mechanisms with storage capacities in the ground as well as in the overlying planted area with the populations of microorganisms, bacteria and algae settled therein, the method according to the invention provides an efficient possibility of removing heavy metals and organic contaminants to a high degree from the waste water, whereby the contaminants are prevented from entering the environment or finding their way into the food cycle. For example the oil-in-water concentration can be reduced from an initial 200 to 300 ppm to a final oil concentration of 0 to 3 ppm. At the same time the salt content is increased from 6,000 to 8,000 ppm to approximately 20,000 to 25,000 ppm. The heavy metal concentration is at least reduced to such a degree that it satisfies irrigation standards. In particular the highly noxious element boron is lowered from an initial content of 4 to 7 ppm to a final value of less than 3 ppm.

The planting provided in the reed bed area can also be used for economical purposes. Therefore, use can be made e.g. of fodder plants such as *Chloris gayana* and *Cenchrus ciliaris* or ornamental plants such as *Prosopis cineraria, Salvadora persice* or *Ipomoa pes-caprae*. These plant species show a certain tolerance to the salt content of the ground water. Moreover, it is conceivable to make use of plants containing valuable natural substances, such as eucalyptus or jojoba that are used in the cosmetic industry. The harvesting of the respective useful plants can take place by means of the utility vehicles and/or devices moved on the trafficable dams. The recovery of the mineral salts contained in the waste water takes place in the ensuing saline area through the evaporation of the residual water, which can be sped up further by spraying devices, such as sprinklers. This method is especially suitable in regions situated in a very dry climate.

Furthermore, it is preferred if the supply of waste water to the reed bed area is controlled such that within a substrate layer with the roots of the planting a defined flow, in particular a laminar overflow of the ground surface, is present.

In addition to this laminar surface flow another water-flow regime exists below the surface where the ground of the reed bed is saturated with the waste water as long as the water level is just above the ground surface. The water level suitably amounts to 0 to 20 cm. A temporary raising of the water level is useful to wash away any possible salt encrustations on the plants. To ensure an optimum irrigation accompanied by a simultaneous degradation of the contaminants, a supply of waste water of approximately 0.05 $m^3/m^2$ of ground surface per day is typically suitable, which, in the case of complete cultivation of the reed bed surface, can gradually rise to the fourfold to fivefold amount of this value.

Within each individual reed bed the waste water is supplied above the ditches, which are provided between the individual reed bed basins and preferably contain gravel material, and then seeps onto the ground of the basin area. As soon as the gravel ditches are saturated with water, the water starts seeping through laterally to reach the basin area lying below.

By means of water-level sensors arranged in the individual areas, observance of the required water level is surveyed. Through a control means the waste water supply to the distribution channel or a further external supply of waste water to individual reed bed basins is controlled so that an adequate water level ensuring at the same time a laminar overflow accompanied by an additional flow regime underneath the ground surface is present. In addition, the control of the flow rate of the waste water can take place by way of further control units and valve means provided in the lines that connect the individual basins. Apart from the water level further essential parameters required for controlling the waste water supply are the concentration of contaminants, the turbidity and the salt content of the waste water. To determine these physical-chemical parameters the use of sensors proves to be of advantage. For example if the concentration of contaminants is still too high the dwelling time of the waste water fluid elements can be increased through a reduction of the waste water supply in order to thereby allow the ecosystem more time for further degradation of the contaminants.

Furthermore, it is of advantage if the waste water is aerated and/or warmed in the individual areas, in particular in the reed bed area.

A significant contribution to the degradation of the contaminants is made by aerobic processes that require oxygen. To increase the rate of these processes oxygen or air can additionally be introduced into the waste water system. The additional oxygen ensures that the oxidation processes that are responsible for the degradation of the organic molecules in particular take place at a faster rate. Moreover, the growth of aerobic bacteria is thereby stimulated in a sustained manner. Advantageously, aeration takes place simultaneously in several places and can be assisted by mixing devices that effect a mixing of the oxygen-enriched water. By preference, the air is introduced in the ground area or at another place of great water depth because there the content of oxygen is lowest compared to the water located close to the surface. If the method according to the invention is applied in colder regions or in the case of weather conditions prevailing in colder periods with less solar radiation and a lower air temperature it is of advantage for the waste water to be additionally warmed. As a result, the biochemical metabolization of the contaminants can be sped up. Besides, the rate of evaporation of the waste water is thereby increased.

For best suitability, the supplied thermal energy is fed by media having a high specific thermal capacity, as for example water. A combination of the supply of oxygen or air together with thermal energy is also suitable. In addition to the external supply of the thermal energy by fluids provision can also be made for specific heating devices that effect a localized warming of the waste water in the individual basins. The distribution of the warmed water can be assisted by additional mixing devices.

Furthermore, it is suitable if nutrients and/or biological cultures, in particular micro-organisms, bacteria, algae or fungi are fed to the waste water.

The feeding of additional nutrients fosters not only plant growth particularly in the reed bed area, but also the flourishing of micro-organism cultures. If a healthy stock of plant and animal material both above and underneath the ground surface of the basins is in existence, a higher uptake and rate of degradation of the contaminants is achieved. The additional feeding of bacteria, algae or fungi has a supportive effect on both the degradation of contaminants in the reed bed area and the production of natural materials of a higher quality in the modular basin area. To avoid an oversupply of nutrients and/or biological cultures it is of advantage that in the individual areas appropriate sensors are provided which determine the content of nutrients through chemical-analytical methods and the organism stock through turbidity measurement. Since the individual areas each meet different requirements and have varying functionalities, the supply of nutrients and micro-organisms is carried out locally in a defined manner in the basin zones intended for this purpose. The supply can take place via specific line systems that are stationary or also by means of utility vehicles that are deployed on the dams. As nutrients mineral salts are especially suitable for the plant stock while proteins are suitable for the animal populations.

It is according to the invention, if useful animals, plants and/or micro-organisms are cultivated in the modular basin area.

Depending on the salt content of the waste water different fish and shrimps species can be cultivated. Specific algae species are suitable for the production of pigments, vitamins and polyunsaturated fatty acids as well as proteins. In waste water areas having an extremely high content of salt the cultivation of bacteria and archaea is possible. These can serve for the production of polyhydroxyalkanoates, etherlipids, pigments and hydrogels. Such fine chemicals are utilized in the cosmetic and food industry. With these high-quality products a considerable part of the costs required for the operation of the plant can be amortized through the method in accordance with the invention.

BRIEF DESCRIPTION OF THE FIGURES

In the following the invention will be described in greater detail by way of schematic embodiments with reference to the drawings. Herein identical reference signs refer to identical elements.

The illustrations show.

DETAILED DESCRIPTION

Various embodiments of the plant according to the invention are conceivable. In the following a preferred embodiment will be described.

Figure 1:
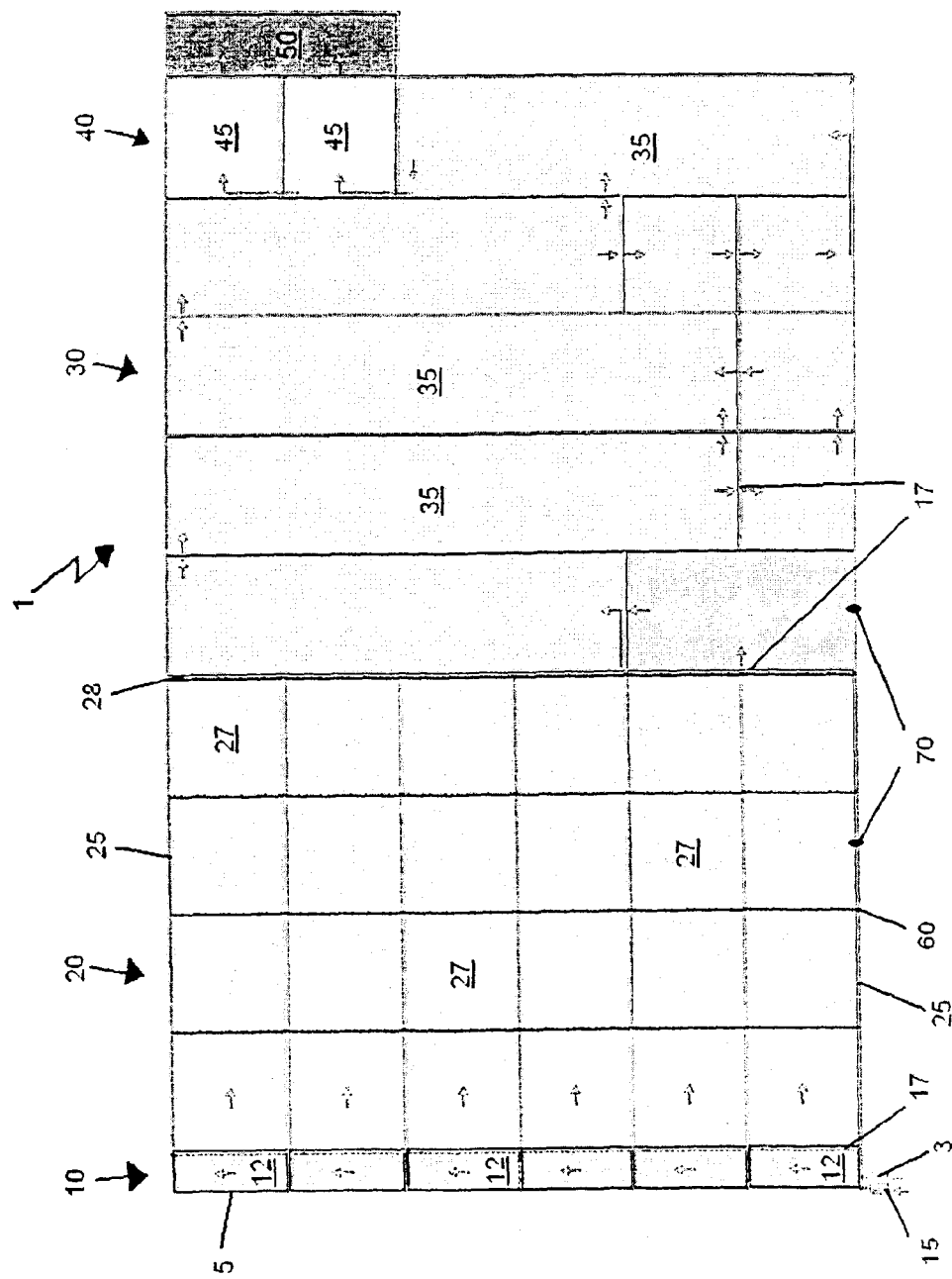
FIG. 1 a top view of the plant in accordance with the invention.

In the embodiment shown in FIG. 1 the waste water is introduced via a waste water supply line 3 into the distribution channel 5. The distribution channel 5 has a width of a few meters and a length of around 2 km. Before being introduced into the distribution channel 5 the waste water runs through a control means 15 which controls the inflow rate of the waste water into the distribution channel 5 and therefore into the entire plant 1. The control means 15 is connected to sensors 70 for measuring the water level, the oil-in-water content and the flow rate of the waste water in the individual areas 10, 20, 30 and 40. The distribution channel 5 evenly distributes the waste water to six settling basins 12 arranged next to one another that have a width of approximately 100 m and a length of approximately 300 m. These settling basins 12 constitute in their entirety the settling area 10. In the settling area 10 the flow rate of the waste water is lowered and in doing so the residual oil present in the water is given the possibility of absorbing on the waste water surface. The absorbed proportions of residual oil are sucked off from the surface by means of a skimmer unit 92. The sucked-off residual oil is collected in an oil collecting tank 93 that is emptied regularly. This residual oil can be removed for purification or processing. The six parallel arranged settling basins 12 constitute the starting point for the subsequent six reed bed segments 25, which form the reed bed area 20 and are divided for their part into four terraced reed bed basins 27 of equal size. A single reed bed basin 27 has dimensions of around 300 m in length and width. For the subdivision into the individual segments 25 and basins 12, 27, 35, 45, 50, dams 60 are provided that are paved to such an extent that it is possible to walk and/or drive on them with utility vehicles. Following an adequate dwelling time of the waste water in the settling area 10 the waste water is distributed evenly by distribution means designed as connecting channels 17, which are provided between the settling area 10 and the reed bed area 20, to the parallel arranged reed bed segments 25 and passed further on. The connecting channels 17 are provided with valve means 83 so as to control the feed rate of the waste water into the reed bed area 20. The valve means 83 of the connecting channels 17 are connected to the control means 15 so that the flow rate can be controlled in particular as a function of the respective water levels.

The reed bed basins 27 are planted with reed of the species *Phragmites australis*, which are rooted on a substrate layer of around 20 cm. Below this substrate layer a sealing layer of approximately 20 cm thickness is provided that consists of fine compacted sand or laborite. By means of these ground layers an uptake and binding of the heavy metal ions takes place, while the reed plants and the settled bacterial cultures metabolize the organic contaminants of the waste water. On the dams 60 arranged between the reed bed basins 27 utility vehicles operate that are made available for taking care of the reed plants and for the maintenance of the technical devices arranged in the reed bed area, in particular the sensors 70 and the connecting channels 17. The individual reed bed basins 27 of a reed bed segment 25 have a decreasing level in the flow direction so that the waste water flows from one reed bed basin 27 into the basin lying below by being driven solely through the effect of gravitation. In addition to the degradation and uptake of the contaminants a significant evaporation of water and thickening of the waste water also takes place in the reed bed area 20. This evaporation takes place through both the large open water surface and the leaf mass of the reed material.

After having passed through the reed bed area 20, the purified waste water is collected in a collecting channel 28. In this collecting channel 28 further sensors 70 are provided which check in particular the degree of purification of the waste water. Should the pollution burden still prove too high, provision is made for the waste water to be redirected to the starting area of the reed bed area 20 for further purification. Waste water considered as being sufficiently contaminant-free is then passed on into the modular basin area 30 which, for its part, is divided into individual utility basins 35. These utility basins 35 are also subdivided by dams 60. In the utility basins 35 useful plant cultivations and animal cultures of different types are cultivated. Due to the fact that in the flow direction a further evaporation and therefore an increase in the salt content of the waste water is present, the utility basins 35 having a relatively low content of salt are provided in particular for animal species, such as fish and shrimps, whereas the utility basins 35 having a higher content of salt are reserved for the more salt-resistant, less complex forms of life, such as algae, fungi or bacteria and other micro-organisms.

Via the trafficable dams 60 nutrients can be supplied to the useful cultures settled in the modular basin area 30 or developed contaminants can be removed. Between the individual utility basins 35 provision is also made for connecting channels 17 with valve means 83 that function as distribution means to control the flow rate of the waste water through the individual utility basins 35 and therefore the dwelling time. In this way, in each individual utility basin 35 an optimum salt content can be set for the plant or animal species settled therein. The individual utility basins 35 furthermore have differing dimensions in order thereby to be able to produce a suitable quantity of animal or plant products according to the market situation. Following on from the modular basin area 30 the waste water enters into the saline area 40 that consists of two parallel arranged saline basins 45. In the saline area 40 the water is evaporated through solar radiation or, as the case may be, through further heating means so that the salts dissolved therein precipitate gradually and can eventually be recovered in the disposal basin 50 that follows the saline area 40.

Figure 2:
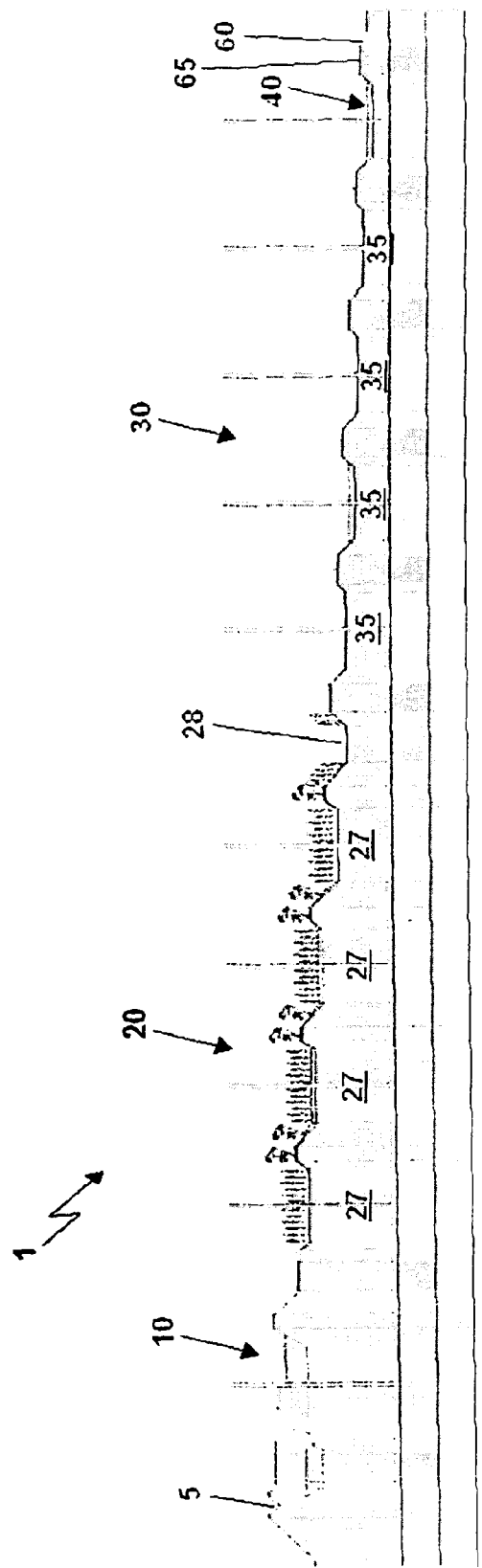
FIG. 2 a cross-section in the longitudinal direction of the plant in accordance with the invention.

In FIG. 2 the cross-section in the flow direction of the plant in accordance with the invention clearly illustrates the stepped arrangement of the individual areas 10, 20, 30, 40 and of the individual basins 12, 27, 35, 45, 50. The waste water is fed at the highest point of the plant 1 on the distribution channel 5 into the plant 1 and runs from there successively through the settling area 10 and subsequently the reed bed area 20 with four serially arranged reed bed basins 27. After having passed through the reed bed area 20 the waste water is collected in a collecting channel 28 in order to be then led into the modular basin area 30 with four serially arranged utility basins 35 for the utilization of animal cultures or plant cultivations and finally to be transferred to the saline area 40 for the final evaporation of the residual water and for the recovery of the contained mineral salts. The individual areas 10, 20, 30, 40 and basins 12, 27, 35, 45, 50 are separated from one another by dams 60 on which a paved road 65 is provided.

Figure 3:
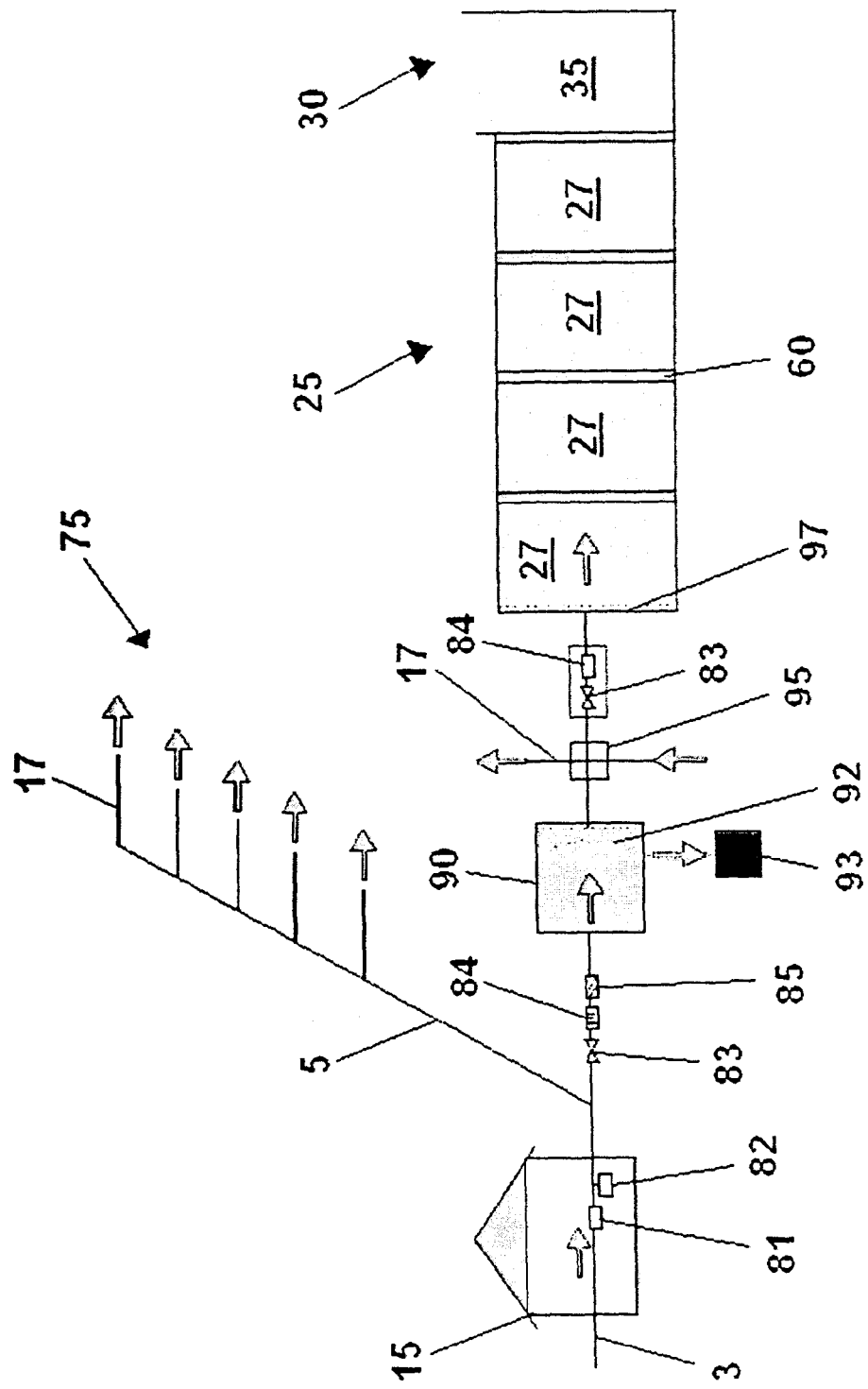
FIG. 3 a schematic illustration of the control and regulating system of the plant in accordance with the invention.

In FIG. 3 the control and regulation system of the plant according to the invention is shown in overview. Initially, the waste water is led via a waste water supply line 3 to a control means 15. The control means 15 has both a flow meter 81 for measuring the flow rate of the waste water and a measuring device 82 for measuring the proportion of residual oil in the waste water. After having passed through the control means 15 the waste water flows into the distribution channel 5 and is divided from there via connecting/distribution channels 17 into six parallel flow paths 75. At the beginning of each flow path 75 a valve 83 and a flow regulator 84 with its own power supply 85 are provided. By means of the valve 83 and the flow regulator 84 the flow rate of the waste water can be adapted appropriately to the respective requirements. Once the flow rate has been set, the waste water enters an oil-water-separating unit 90 that has a skimmer unit 92 which takes up proportions of residual oil adsorbed on the water surface and conveys them to an oil collecting unit 93. Following the separation of the adsorbed proportions of residual oil the waste water enters into a distribution unit 95. The distribution unit 95 is connected to connecting/distribution channels 17 which enable the distribution of the waste water between the parallel arranged flow paths 75 as well as an external feeding of additional waste water, nutrients etc. After having passed through the distribution unit 95 the flow rate of the waste water is re-set by a further valve 83 and a flow regulator 84 in order to enter into a reed bed segment 25. The reed bed segment 25 consists of four serially arranged reed bed basins 27 that are planted with the reed plant *Phragmites australis*. The individual reed bed basins 27 are subdivided by dams 60, whereby the individual dams 60 additionally have an overflow line (not shown) for draining excess waste water. The overflow lines are connected to a water level setting unit 97 which is arranged at the beginning of the reed bed segment 25 and sets an appropriate water level of the waste water. Following on from the reed bed segment 25 the waste water enters into a utility basin 35 at the beginning of the modular basin area 30.

The invention claimed is:

1. Plant for the treatment and disposal of waste water containing salts and oil, in particular water used in oil production, comprising
    a feeding duct for supplying the waste water,
    at least one reed bed area having plants for the uptake and degradation of contaminants in the waste water,
    at least one modular basin area having a plurality of utility basins, which are designed for the cultivation of plants, algae, for the culture of animals, fish, shrimps and/or micro-organisms whereby a utility basin, controlled by way of distribution means, can be supplied with treated waste water from the reed bed area and/or from at least one other utility basin and
    at least one saline area for the reception of the residual water from the modular basin area for the evaporation of water and the concentration of salt,
    wherein
    the reed bed area has several parallel arranged reed bed segments, which are each formed of several reed bed basins that are arranged and flowed through in series,
    in that between the feeding duct and the reed bed area one settling area is provided for receiving the waste water and in which a flow speed of the waste water is reduced for separating oil proportions,
    in that the settling area has several settling basins according to the number of reed bed segments and
    in that on the settling area a distribution channel is provided for the supply and distribution of the waste water to the settling basins,
    in that for recovering residual oil in the settling area with the several settling basins surface skimmers are provided, with which oil can be sucked off from the surface and directed to collecting tanks.

2. Plant according to claim 1,
    wherein
    between the individual areas trafficable dams are provided.

3. Plant according to claim 1,
    wherein
    the settling area, the reed bed area, the modular basin area and the saline area are arranged with their basins in a terraced manner and on decreasing levels in the flow direction of the waste water.

4. Plant according to claim 1,
    wherein
    the flow of the waste water through the plant is effected by way of gravitation.

5. Plant according to claim 1,
    wherein
    a control means with sensors for measuring and setting chemical-physical parameters of the waste water is provided.

6. Plant according to claim 1,
    wherein
    the ground of the reed bed area has a lower sealing layer for sealing and an upper substrate layer for planting, and in that the reed bed area is planted with reed plants, in particular *Phragmites australis*.

7. Method for the treatment and disposal of waste water containing salts and oil, in particular with a plant according to claim 1, whereby the waste water successively flows through
    at least one reed bed area having plants for the uptake and degradation of contaminants in the waste water,
    at least one modular basin area having a plurality of utility basins, whereby a utility basin, in which useful animals, plants and/or micro-organisms are cultivated, being controlled by way of distribution means, is supplied with treated waste water from the reed bed area and/or from at least one other utility basin and
    at least one saline area for the reception of the residual water from the modular basin area and for the evaporation of water and the concentration of salt,
    wherein
    several parallel arranged reed bed segments of the reed bed area are flowed through which are each formed of several reed bed basins that are arranged in series and
    in that the waste water is received in at least one a settling area to which follows up the reed bed area and in which a flow speed of the waste water is reduced for separating oil proportions, whereby
    at the settling area a distribution channel is provided for the supply and distribution of the waste water to the settling basins and in that in the settling area according to the number of reed bed segments several settling basins are provided with surface skimmers, with which oil is sucked off from the surface and directed to collecting tanks for recovering residual oil.

8. Method according to claim 7,
wherein
the supply of waste water to the reed bed area is controlled such that within a substrate layer with the roots of the planting a defined flow, in particular a laminar overflow with an additional underground flow regime, is present.

9. Method according to claim 7,
wherein
in the individual areas, in particular in the reed bed area, the waste water is aerated and/or warmed.

10. Method according to claim 7,
wherein
nutrients and/or biological cultures, in particular micro-organisms, bacteria, algae or fungi are fed to the waste water.

11. Plant for the treatment and disposal of waste water containing salts and oil, in particular water used in oil production, comprising
a feeding duct for supplying the waste water,
at least one reed bed area having plants for the uptake and degradation of contaminants in the waste water,
at least one modular basin area having a plurality of utility basins, which are designed for the cultivation of plants, algae, for the culture of animals, fish, shrimps and/or micro-organisms whereby a utility basin, controlled by way of distribution means, designed to be supplied with treated waste water from the reed bed area and/or from at least one other utility basin and
at least one saline area for the reception of the residual water from the modular basin area for the evaporation of water and the concentration of salt,
wherein
the reed bed area has several parallel arranged reed bed segments, which are each formed of several reed bed basins that are arranged and flowed through in series,
between the feeding duct and the reed bed area one settling area is provided for receiving the waste water and in which a flow speed of the waste water is reduced for separating oil proportions,
the settling area has several settling basins matching the number of reed bed segments and
on the settling area a distribution channel is provided for the supply and distribution of the waste water to the settling basins,
for recovering residual oil in the settling area with the several settling basins surface skimmers are provided, with which oil can be sucked off from the surface and directed to collecting tanks.

12. Plant according to claim 11,
wherein
between the individual areas trafficable dams are provided.

13. Plant according to claim 11,
wherein
the settling area, the reed bed area, the modular basin area and the saline area are arranged with their basins in a terraced manner and on decreasing levels in the flow direction of the waste water.

14. Plant according to claim 11,
wherein
the flow of the waste water through the plant is effected by way of gravitation.

15. Plant according to claim 11,
wherein
a control means with sensors for measuring and setting chemical-physical parameters of the waste water is provided.

16. Plant according to claim 11,
wherein
the ground of the reed bed area has a lower sealing layer for sealing and an upper substrate layer for planting, and in that the reed bed area is planted with reed plants, in particular *Phragmites australis*.

\* \* \* \* \*